United States Patent [19]

Hall

[11] 4,281,863
[45] Aug. 4, 1981

[54] EXHAUST TUBE CLAMP

[75] Inventor: John F. Hall, Bloomfield Hills, Mich.

[73] Assignee: Chrysler Corporation, Highland Park, Mich.

[21] Appl. No.: 80,913

[22] Filed: Oct. 1, 1979

[51] Int. Cl.$^3$ ............................................. F16L 13/14
[52] U.S. Cl. .................................. 285/382.2; 24/279; 285/420
[58] Field of Search ..................... 285/382.2, 420, 253, 285/367; 24/284, 279, 278, 277

[56] References Cited

U.S. PATENT DOCUMENTS

| | | | |
|---|---|---|---|
| 3,014,259 | 12/1961 | Joseph | 285/367 X |
| 3,061,903 | 11/1962 | Jagiel | 285/382.2 X |
| 3,132,402 | 5/1964 | Joseph | 24/284 |
| 4,141,577 | 2/1979 | Beebe | 285/382.2 |

FOREIGN PATENT DOCUMENTS 1021277  3/1966  United Kingdom ...................... 24/279

Primary Examiner—Thomas F. Callaghan
Attorney, Agent, or Firm—Newtson & Dundas

[57] ABSTRACT

A clamp particularly suited for crimp joining the telescoped end portions of thin walled tubing which is prone to inward collapse when overly constricted. The clamp includes an upper and a lower member each of thin metal material and each forming a curved mid-portion the arcuate edge of which contacts the surface of the outer telescoped tube member. Overlying portions at one side of the two clamping members forms a hinging action about the tube. At the opposite side of the members, tubular contours are formed in aligned relationship to one another to receive a bolt and nut fastener. The fastener is operated to draw the upper and lower members together about the exhaust tubes. Prior to operation of the fastener, the configuration of the members is such that a gap is formed between the facing end surfaces of the adjacent tubular portions. As the nut-bolt fastener draws the upper and lower members together and crimps the tubes together, these end surfaces move toward one another until engagement thus establishing a desired limited clamping and crimping action on the tubes.

2 Claims, 7 Drawing Figures

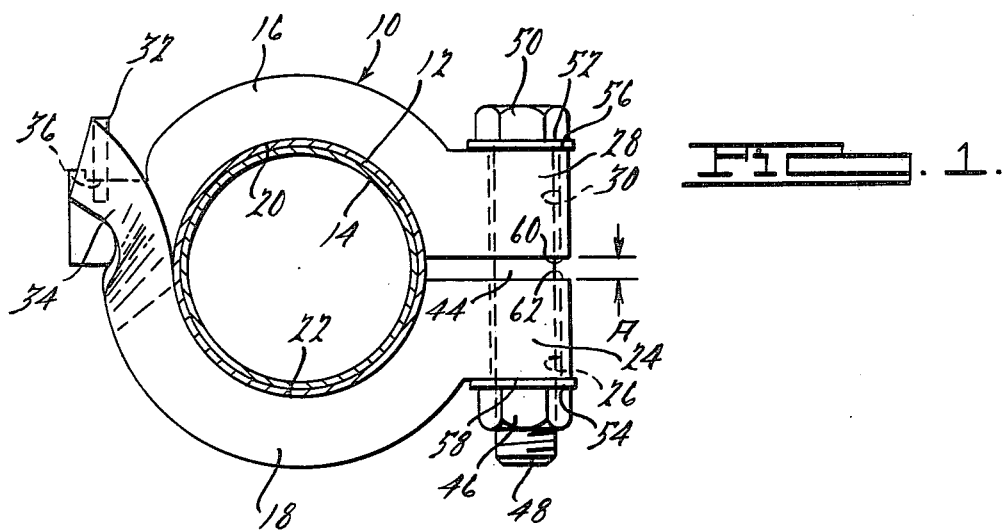
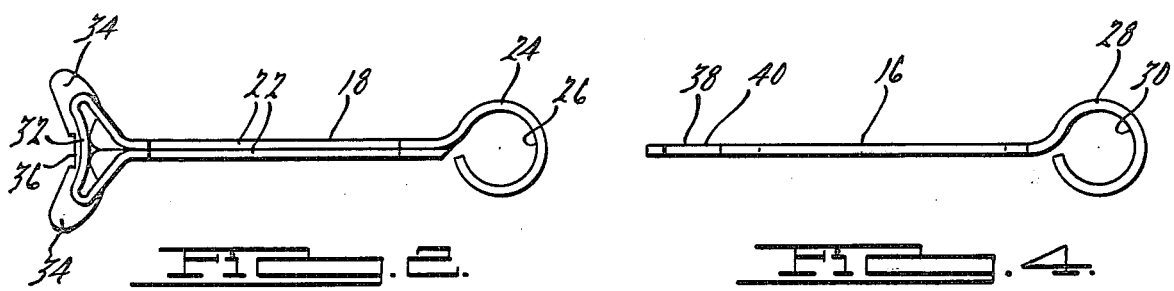
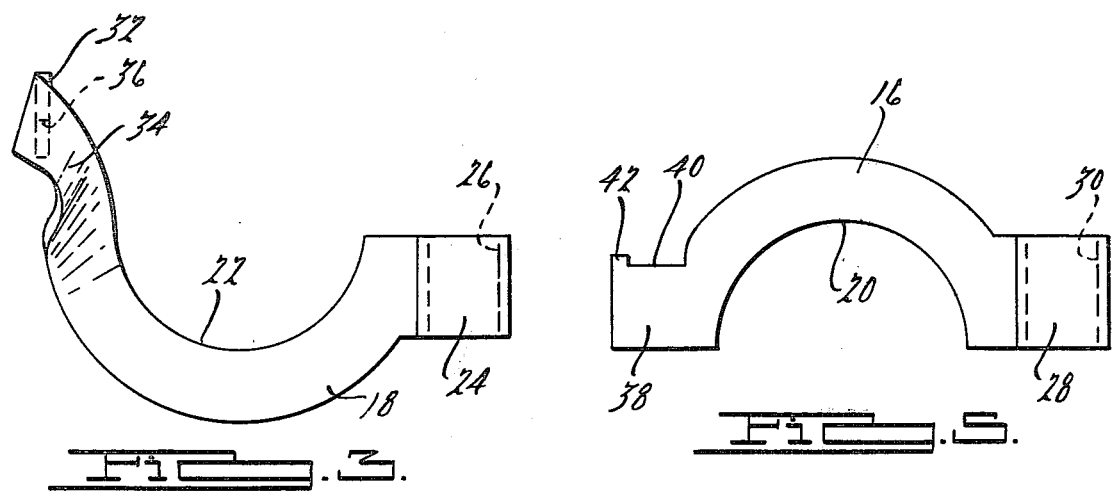
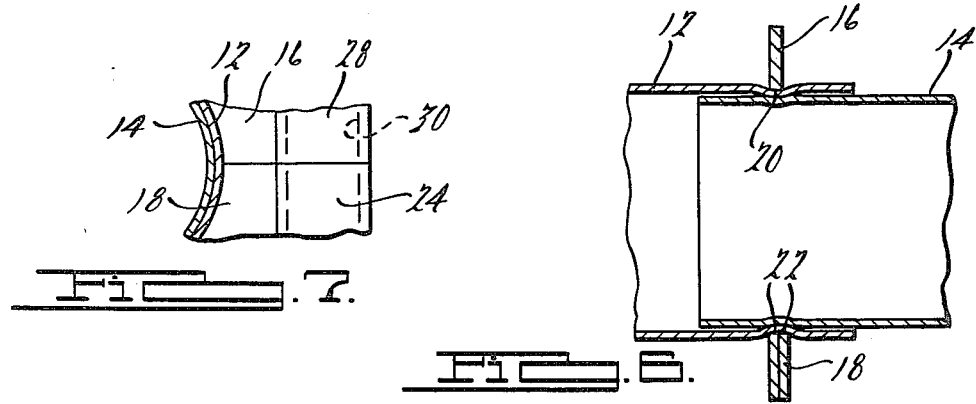

EXHAUST TUBE CLAMP

This invention relates to clamps particularly for thin walled tubing which is prone to collapse inwardly when subjected to clamping. The clamps are provided with integral means to produce only a limited crushing or indentation of the tubes.

Prior exhaust clamps commonly include a saddle member having tubular portions formed along either side through which threaded legs of a U-bolt clamp extend. Nuts threaded on the legs of the U-bolt tend to pull a mid-portion toward the saddle portion to constrict a tube placed therebetween. Generally this type of clamp produces large constrictive forces and is satisfactory but may exert a much greater clamping force than is desirable with thin-walled tubing. Thin-walled tubing is increasingly desired both for lightening vehicles and improving mileage. A problem with the thin-walled tubing is its relatively great tendency to collapse when significant constrictive forces are applied thereon by an exhaust clamp. It is thus desirable to utilize an exhaust clamp which engages practically the entire periphery of the tubing and yet limits the constrictive crimping action on the tube to produce only a predetermined distortion.

The subject exhaust clamp includes an upper and lower member each having a mid-portion with an oval or circular configuration with a curved edge thereon adapted to engage the outer surface of two telescoped tubes. Each of the upper and lower members has a tubular portion formed along one side edge. The tubular portions are aligned in assembled position to receive a bolt fastener. The opposite side edge of the members are formed to engage in overlying fashion so as to form a hinging action therebetween. As assembled about the exhaust tubes prior to final tightening of a nut on the bolt, a gap is formed between facing end surfaces of the tubular portions. This gap is progressively decreased as the fastener is operated so as to pull the upper and lower members together. The mid-portions of the members crimpingly engage the outer tube and deforms it inward against the inner tube. When the gap is finally eliminated, a large increase in the torque requirement to further tighten the clamp signals when the predetermined desired crimping action has been achieved. Further tightening does not constrict the tubes to a greater extent.

Therefore an advantageous feature and object of the present invention is the provision of a simple exhaust clamp which utilizes a single bolt and nut fastener to clamp upper and lower members about a tube. The members are arranged and configured so that only a predetermined amount of crimping action on the tubing occurs. A further object is to provide a simple and economical clamping means formed of sheet metal parts so configured to extend substantially about the periphery of the tubing and to distort the tubing in a crimping fashion a predetermined amount only so that a predetermined deformation occurs.

Further objects and advantages of the present invention will be more readily apparent from a reading of the following detailed description, reference being had to the drawings in which a preferred embodiment is illustrated.

IN THE DRAWINGS

FIG. 1 is an elevational view of the exhaust clamp extending about exhaust tubing and in an untightened operative mode;

FIG. 2, is a planar view of the clamp's lower member shown in FIG. 1;

FIG. 3, is an elevational view of the lower member shown in FIG. 1;

FIG. 4, is a planar view of the clamp's upper member shown in FIG. 1;

FIG. 5, is an elevational view of the clamp's upper member shown in FIG. 1;

FIG. 6, is a sectioned view of the clamp and telescoped exhaust tubing in final assembled condition subsequent to tightening of the fastener shown in FIG. 1;

FIG. 7, is a fragmentary view of the clamp in the final assembled condition.

In FIG. 1 of the drawings, an exhaust clamp 10 is shown circling exhaust tube 12 and an exhaust tube 14. The ends of the exhaust tubes are telescoped within one another as is shown in FIG. 6. The exhaust clamp 10 includes an upper portion 16 and a lower portion 18. The portions 16 and 18 include semi-circular edge portions 20 and 22 which engage the outer tube 12 about substantially the entire circumference. As can be seen in FIGS. 2 and 4 the members 16 and 18 are formed from relatively thin metal material. The mid-portion of the lower member 18 includes side-by-side portions each having a semi-circular edge 22. The rightward side or end portion of the lower member 18 is formed to create tubular part 24 which defines an inner diameter opening 26. Likewise, the upper member 16 includes a tubular portion 28 formed along its rightward end or side edge which defines opening 30. In an assembled position shown in FIG. 1 openings 26 and 30 are aligned. Referring to FIGS. 2 and 3, the leftward side or end of the lower clamp portion 18 is twisted and formed in a manner to provide a bridge portion 32 extending parallel to the axis of the tubing 12 and 14. The bridge portion 32 is integral with reversely bent portions 34 which join it with the dual mid-portions. As can be seen in FIGS. 2 and 3, the reversely bent portions 34 in the vicinity of bridge 32 changes the orientation of the mid-portion from a circumferential direction to an axial direction with respect to the tubes 12 and 14. The bridge 32 also includes a notch 36 formed on its lower edge which forms a bearing surface, its purpose to be more fully explained hereinafter.

The upper member 16 shown in FIGS. 4 and 5 includes a radially extending portion 38 the left end or side edge which is opposite tubular portion 28. The portion 38 defines a bearing surface 40 adapted to engage the notched surface 36 of bridge portion 32. The bearing action between the surfaces 36,40 acts as a hinge between the members 16 and 18 and offset tab portion 42 on portion 38 acts to radially restrain the bridge portion 32 during assembly.

As shown in FIG. 1, the aligned tubular portions 24,28 receive an elongated bolt fastener 44. A nut 46 engages the threaded end 48 of the bolt 44 in conventional fashion. The head 50 of the bolt 44 bears on washer portion 52 while another washer 54 is located adjacent the nut fastener 46. The washers 52,54 in turn bear against the upper and lower end portions 56 and 58 the tubular portions 24,28.

In FIG. 1, adjacent and facing end surfaces 60 and 62 are spaced prior to tightening the nut and bolt fastener 44,46 so as to embed the circular portions 20,22 into the telescoped tubes. Thus FIG. 1 illustrates an untightened assembly position of the clamp. In FIG. 6, the telescoped tubes 12 and 14 are shown after the fastener 44 and nut 46 have been tightened sufficiently to eliminate gap A shown in FIG. 1. The elimination of the gap A permits the surfaces 60,62 of the tubular portions 24,28 to engage. This restricts further crushing or creasing of tubes. The dimension A in FIG. 1 is equal to approximately twice the radial indentation of the members 16 and 18 into the tubes 12,14. Normally this is about twice the tube thickness. In FIG. 6, a fragmentary view of a clamp portion is illustrated with the end surfaces 60 and 62 engaging to illustrate the final assembled position of the clamp with the members 16 and 18 embedded in the telescoped tubes 12 and 14.

The end surfaces 60,62 in FIG. 1 which form the gap A are illustrated in FIG. 1 as being substantially parallel. Actually, the surfaces extend in radial directions although this divergence is very slight when used with thin-walled tubing. Ideally, the surfaces would engage in parallelism when the clamp is tightened as shown in FIG. 7.

The embodiment shown in FIGS. 1–5 utilizes a hinge connection integral with members 16,18. This is a desireable feature. However, the hinging action between members 16 and 18 could also be made by overlapping the end portions and extending a rivet or pin therethrough.

Another change which is contemplated in the formation of an oval or out-of-round curved surface in place of the semi-circular surfaces 20,22. This would more directly effect antirotation action between two clamped tubes.

Although embodiments of the invention have been described and only one illustrated in the drawings, other embodiments or modifications to the preferred embodiment are contemplated which would still fall within the scope of the following claims which claim the exclusive property in the invention.

I claim:

1. In an exhaust system utilizing thin-walled tubing subject to extreme radial collapse when constrictive forces above a given force range are applied thereto, a self-limiting clamp for joining and sealing telescoped end of an inner and outer tube comprising; an elongated upper and lower member each having curved mid-portion for engaging the outer tube about substantially its entire periphery; each member also having a tubular portion formed along one end edge portion and with each tubular portion being in axial alignment with one another when the members are assembled loosely about the tubing; means including the second opposite end edge portions to form a hinging action between the members; the hinging means including portions of the lower member which is formed of a continuous single strip of metal, one end of which is formed in the tubular portion at the one end edge, the second end edge portion being formed by turning the strip back upon itself so that the mid-portion of the member has a double thickness, a portion of the turned back strip extending normal to the plane of the mid-portion to form a bridge of substantial depth as compared to the thickness dimension of the metal strip, the bridge portion being formed by bending distortion of the strip so that an opening is produced beneath the bridge portion and between it and the remainder of the strip, the second end portion of the upper member being extended for projection through the opening and beneath the bridge portion for subsequent bearing engagement with the bridge portion; fastener means extending through the aligned portions for selectively drawing the member and particularly the tubular portions toward one another, the tubular portions defining facing end surfaces between the members and being configured so that a gap therebetween is formed when the members are loosely assembled about the tubing whereas operation of the fastener means draws the facing end surfaces together to cause the curved mid-portions to engage and radially distort the outer telescoped tube in a controlled manner.

2. In an exhaust system utilizing thin-walled tubing subject to extreme radial collapse when constrictive forces above a given force range are applied thereto, a self-limiting and self-aligning clamp for joining and sealing the telescoped ends of an inner and outer tube comprising: elongated upper and lower members each having only a substantially flat mid-portion in a plane generally normal to the longitudinal axis of the tubing thus presenting edge engagement with the tubing surface and also having the mid-portion curved in the circumferential direction of the tubing for engaging the outer tube about substantially its entire periphery; a roll formed tubular portion along a first end edge portion of each member to define generally cylindrical and elongated tubular portions with axes parallel to the plane of the curved mid-portions; the tubular portions being axially aligned with one another when the clamp is positioned about the outer tube and an elongated fastener means extending through each tubular portion both for aligning and for drawing together the members; means including the second opposite end portions of the upper and lower members forming a hinged connection between the members so that when the fastener means is operated to draw the tubular portions together, the curved mid-portions engage the outer tube; the tubular portions defining facing end surfaces with the members configured relative to the outer tube so that a gap is formed thereby when the clamp is only loosely assembled about the outer tube and whereas tightening of the fastener means draws the facing end surfaces together to eliminate the gap and thereby press the mid-portions of the upper and lower members into the outer tube a limited amount as defined by the engagement between the end faces of the tubular portion.

* * * * *